United States Patent [19]

Peterson

[11] Patent Number: 5,025,125

[45] Date of Patent: Jun. 18, 1991

[54] BRAZING OR SOLDERING METHOD AND DEVICE INCLUDING A LAMINAR FLOW OR GASEOUS FLUX

[75] Inventor: Christer C. I. Peterson, Lidingo, Sweden

[73] Assignee: Aktiebolaget Electrolux, Stockholm, Sweden

[21] Appl. No.: 419,608

[22] Filed: Oct. 10, 1989

[30] Foreign Application Priority Data

Oct. 14, 1988 [SE] Sweden ............................. 8803679

[51] Int. Cl.⁵ ............................................. B23K 1/002
[52] U.S. Cl. .............................. 219/85.11; 219/85.19; 219/85.2
[58] Field of Search ............... 219/85.11, 85.2, 85.19, 219/124.34

[56] References Cited

U.S. PATENT DOCUMENTS

| 3,439,142 | 4/1969 | McGean et al. | 219/85.11 |
| 3,504,149 | 3/1970 | Dixon et al. | 219/85.11 |
| 4,784,491 | 11/1988 | Penney et al. | 219/124.34 |

FOREIGN PATENT DOCUMENTS

| 0041430 | 12/1981 | European Pat. Off. | 219/85.11 |
| 46-9928 | 3/1971 | Japan | 219/85.11 |
| 48-34489 | 10/1973 | Japan | 219/85.11 |

Primary Examiner—Clifford C. Shaw
Attorney, Agent, or Firm—Pearne, Gordon, McCoy & Granger

[57] ABSTRACT

A method and device for joining work pieces by soldering or brazing is disclosed whereby an induction coil is brought to a position where it at least partly surrounds the work pieces which by induction are heated to a suitable temperature for effecting the soldering or brazing operation after which solder is fed to the soldering or brazing area. In order to prevent creation of oxides on the workpiece surface to be joined, a gaseous flux is blown into the soldering or brazing area in a free atmospheric environment before and/or when the solder is fed to soldering or brazing area.

9 Claims, 1 Drawing Sheet

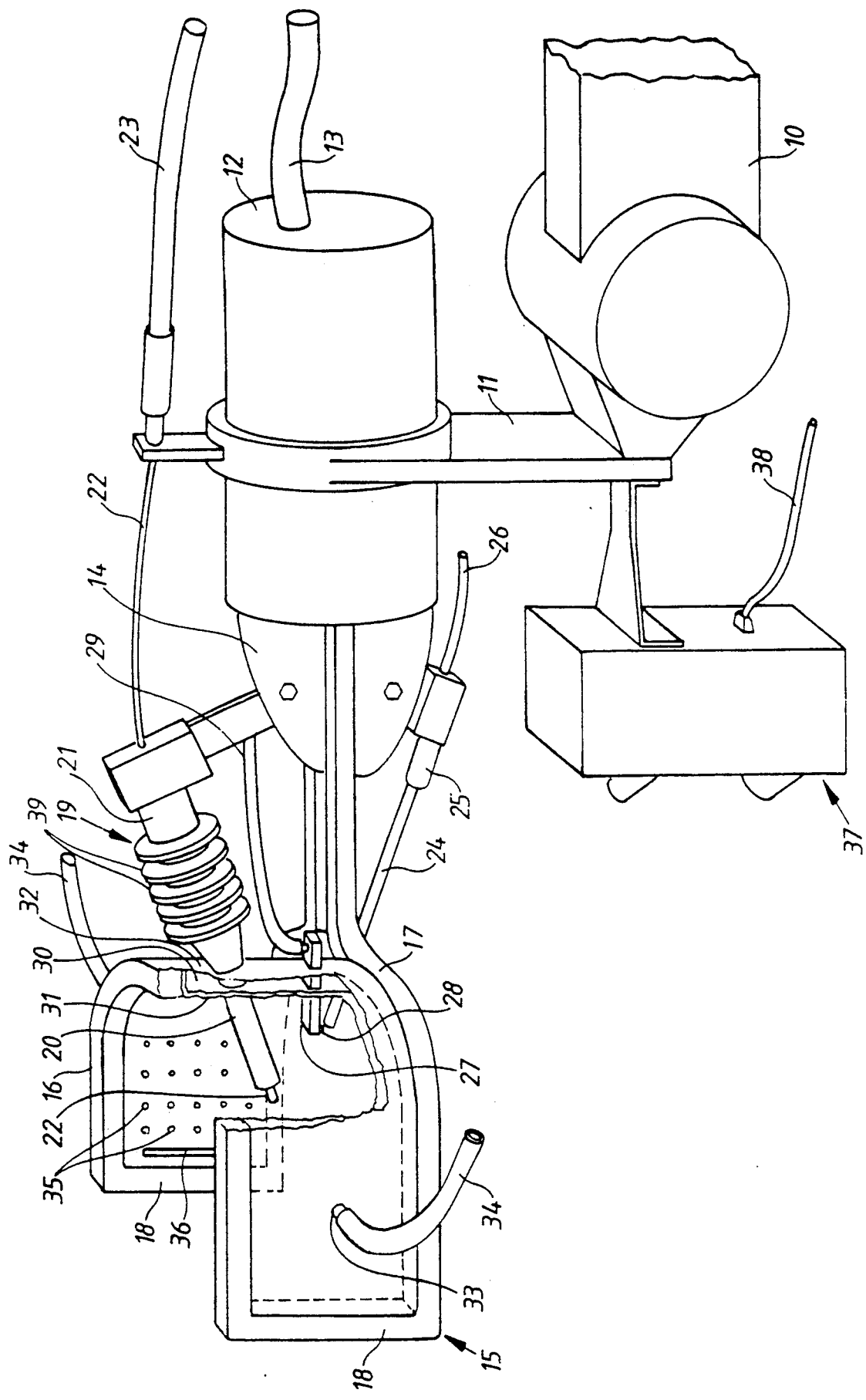

BRAZING OR SOLDERING METHOD AND DEVICE INCLUDING A LAMINAR FLOW OR GASEOUS FLUX

BACKGROUND OF THE INVENTION

This invention relates to a method and a device for joining work pieces by brazing or soldering wherein an induction coil is brought to a position where it at least partly surrounds and is electromagnetically coupled to the work pieces which by means of induction are heated to a suitable temperature for the brazing or soldering operation after which a solder is fed to the soldering or brazing area.

Soldering and brazing are well-known joining methods and are used for fixing two metal parts to each other by means of the so called solder which usually is fed to the soldering or brazing area in wire or powder form. The composition of the solder differs from, and has a lower melting point than, the material in the work pieces. During the soldering or brazing operation the work piece surfaces forming the joints are heated but are never allowed to melt.

In order to achieve a bonding between the solder and the joining work piece surfaces, the surfaces must be free from oxides. Such a clean surface is usually created by a grinding operation or by applying some kind of chemical agent, a so called flux, before or during the soldering or brazing operation. The flux usually is applied as a liquid, a paste or as a powder and is sometimes mixed into the solder. When soldering or brazing in an oven it is also common to use a protective gas in order to prevent the creation of oxides.

Usually brazing and soldering are referred to as different methods where brazing is effected between 600°-900° and soldering below 300° C. Brazing normally gives very good strength and can also be used for power transmitting joints whereas soldering gives comparatively low strength values and therefore is used primarily for sealing purposes and for electric joints.

In order to heat the work pieces, different kinds of heating means are used for the brazing as well as the soldering operation. Thus, for example, gas burners, different types of electric heating and heating in ovens are used. One often used heating method, particularly for automatic manufacturing, is the induction heating method where the work pieces are placed in a coil which is influenced by a high frequency alternating current. One example of the last mentioned method appears from swedish patent No. 8601977-5. According to this patent publication solder is fed to the work pieces after having been preheated to a suitable temperature whereby the flow out of the solder on the joining surfaces is promoted.

One difficulty when using the last mentioned method in an automatic process is that there is a need for fluxes as noted above. These fluxes must be applied manually or by providing the equipment with means by which the brazing or soldering surfaces can be dipped into the fluxes. When the flux is heated, heavy smoke from flux burn-off occurs. Sometimes flux remains in the joint which can cause joints which are not tight. Further, when the soldering or brazing has taken place there is a need for washing the joint by a so called devitrification operation.

The purpose of this invention is to achieve a method and a device which is suited for automatic production where applying the flux is facilitated and where the additional drawbacks referred to above are eliminated.

SUMMARY OF THE INVENTION

In accordance with the present invention, a soldering or brazing area is provided by a U-shaped induction coil structure which at least partially surrounds the work pieces to be joined. As the work pieces are heated by induction, a gaseous flux is, in a free atmospheric environment, blown into the soldering and brazing area to preclude contamination or oxidation of the work piece surfaces to be joined. Solder is then applied to the work piece joint when it has reached a desired temperature as sensed by a fiberoptic infrared detector whose sensing element is cleansed by a gas jet.

BRIEF DESCRIPTION OF THE DRAWING

The drawing is a partly broken perspective view of a device according to the invention.

BRIEF DESCRIPTION OF THE PREFERRED EMBODIMENT

The drawing shows an arm 10 which is the movable part of an industrial robot, the arm being controlled by a robot control means not shown. The arm supports a holder 11 for an induction heating unit 12 to which the supply of current is effected via a cable 13. The unit 12 is, via a fastening means 14, connected to an induction coil 15 which generally defines a brazing or soldering area in which the work pieces intended to be joined are inserted. The coil 15 has an upper U-shaped part 16 and a lower fork-shaped part 17 which are connected to each other via two vertical parts 18. The fastening means 14 further supports a solder pre-heating device 19 which comprises a tube with a front part 20 with a comparatively small outer diameter and rear part 21 with an somewhat larger outer diameter, the rear part having several cooling flanges 39. Through the solder pre-heating device 19 runs a wire-shaped solder 22 which is fed through an envelope 23 by means of solder feeding equipment not shown. The solder feeding equipment is controlled from the previously mentioned robot control means. The fastening means 14 also supports a fiberoptical element 24 which is connected to an infrared detector 25 for measuring the temperature of the heated surfaces to be joined. The detector 25 via a cable 26 is connected to the control means not shown. Within the coil 15 there also is a gas jet nozzle 27 for cleaning by blowing. This nozzle has an opening 28 which is directed towards the outer end, i.e. the eye, of the fibre optical element 24. The other end of the nozzle is, via a hose 29, connected to a gas-source (not shown) by means of which gas under pressure can be blown on the eye of the fiber optical element 24 via nozzle 27.

As appears from the drawing there is a curved chamber 30 between the upper and the lower part of the coil. The chamber is limited by an inner wall 31 and an outer wall 32 and there are sealed side walls extending between these walls and there also is a top and a bottom element.

The walls of the chamber 30 are made from a material which is mainly not heated during the induction phase. The chamber 30 via nipples 33 (only one shown) is connected with hoses 34 which are connected to a source supplying a gaseous flux. The inner wall 31 has several holes or blow openings 35 through which the flux flows to the soldering or brazing area. The size of the holes and the pressure of the gas is chosen so that a laminar flow of the gas is achieved within the brazing or soldering area. Thereby, the surrounding atmospheric air is prevented from mixing with the gas flow thus avoiding contamination of the brazing or soldering area. In order to achieve a sufficient flow of flux about the complete work piece the outer vertical rows of holes can be replaced by a slot 36 or the like. A mixture of 10% hydrogen and 90% nitrogen has been used as a flux with very good results. During these conditions the gas flow has been about 4 l/min. Of course, it is possible to use other gases and gas mixtures and other flow conditions in order to achieve the desired effect. It should be observed that the gaseous flux is applied in a free atmospheric environment and at the atmospheric pressure which is prevailing in the working premises without using a surrounding chamber.

The device also is provided with a scanning device 37 which, without contacting the work pieces, looks for the joints within a pre-determined area and guides the coil to such a position that the soldering or brazing operation can be effected. The scanning device 37 is fastened to the arm 10 and is, via a cable 38, connected to the aforementioned robot control means.

The device described above operates in the following way. The scanning device 37 is programmed to automatically scan certain areas, for example, at the rear of a combined refrigerator and freezer, where several tubes shall be joined. When the device has found the joint in question the coil 15 is brought to it and is moved in a proper position for accomplishing the brazing or soldering operation. Then the induction coil is switched on and the gas and the flux are supplied through the nozzle 27 and the holes 35, 36. This means that the joining surfaces are heated up, the solder is pre-heated in the solder pre-heating device particles and other contaminates which are created during the heating are blown away from the eye of the fibre optical element 24. Then the IR-sensor 25 of the fibre optical element senses a pre-determined temperature, the solder feeding device is actuated which means that the solder 22 is fed to and touches the surfaces to be joined which have been heated, and flows out between these surfaces. Then the current through the induction coil 15 is switched off, the supply of flux and gas ceases after which the joint is allowed to cool. The coil simultaneously is moved to a new soldering or brazing area. All functions are controlled by aforementioned robot control means.

While the preferred embodiment of the invention has been shown and described detail, it is recognized that various modifications and rearrangements may be made without departing from the scope of the invention as defined in the claims.

I claim:

1. A method for joining work pieces by soldering or brazing in which an induction coil is brought to a position to define a soldering and brazing area where the coil at least partly surrounds the work pieces which, by means of induction, are heated to a suitable temperature for the soldering or brazing operation after which a solder is fed to the soldering or brazing area, including the step of blowing a gaseous flux into the soldering or brazing area in a free atmospheric environment before or while the solder is being fed to the soldering or brazing area, wherein the gaseous flux is supplied as a laminar stream of gas.

2. A method according to claim 1, wherein the flux is a mixture of gases.

3. A method according to any one of claim 2, wherein feeding of the solder is initiated by detecting the temperature of the work pieces at the soldering or brazing area.

4. A method according to claim 3, wherein the temperature is sensed optically by an optical measuring device.

5. A method according to claim 4, wherein the optical measuring device is cleaned by blowing a gas on it.

6. A device for joining work pieces by brazing or soldering comprising an induction coil (15) which is movable to a position where it at least partly surrounds the work pieces to define a soldering or brazing area in which the work pieces are to be joined, a solder feeding device by means of which a solder is fed to the soldering or brazing area, a plurality of blow openings (35, 36) in close proximity to the coil (15) for directing a gaseous flux into the soldering or brazing area, wherein said blow openings are sized to induce laminar flow of said gaseous flux to the soldering or brazing area.

7. A device according to claim 6, wherein the blow openings (35, 36) communicate with a chamber (30) which is connected to a source for supplying said gaseous flux.

8. A device according to claim 7, wherein the chamber (30) is U-shaped and the blow openings which are situated close to the ends of the U-shaped chamber are slot-shaped.

9. A device according to claim 7, wherein the temperature of the work pieces in the soldering or brazing area is sensed by means of an optical sensing device (24, 25), the device including at least one nozzle opening (28) through which a cleansing gas is blown onto the optical sensing device to clean it.

* * * * *

UNITED STATES PATENT AND TRADEMARK OFFICE
CERTIFICATE OF CORRECTION

PATENT NO. : 5,025,125
DATED : June 18, 1991
INVENTOR(S) : Peterson

It is certified that error appears in the above-identified patent and that said Letters Patent is hereby corrected as shown below:

On the title page and Column 1, lines 1-4.

The title of the application should read as follows:

--BRAZING OR SOLDERING METHOD AND DEVICE INCLUDING A LAMINAR FLOW OF GASEOUS FLUX--

Signed and Sealed this

Twenty-fourth Day of November, 1992

Attest:

DOUGLAS B. COMER

*Attesting Officer*  *Acting Commissioner of Patents and Trademarks*